(12) United States Patent
Hoshino et al.

(10) Patent No.: US 7,010,640 B2
(45) Date of Patent: Mar. 7, 2006

(54) INTERFACE APPARATUS FOR MEDIATING SENDING AND RECEIVING SIGNALS BETWEEN DEVICES CONNECTED BY A SIGNAL LINE

(75) Inventors: Tsutomu Hoshino, Iwatsuki (JP); Hiroshi Sugita, Iwatsuki (JP); Kenichi Sonobe, Iwatsuki (JP); Hirota Takahashi, Iwatsuki (JP); Kazuya Edogawa, Iwatsuki (JP); Tomokazu Kaneko, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 490 days.

(21) Appl. No.: 10/314,310

(22) Filed: Dec. 9, 2002

(65) Prior Publication Data

US 2003/0115400 A1    Jun. 19, 2003

(30) Foreign Application Priority Data

Dec. 13, 2001    (JP) ............................. 2001-380281

(51) Int. Cl.
*G06F 13/20* (2006.01)
*G06F 13/42* (2006.01)
(52) U.S. Cl. ...................... 710/313; 710/105
(58) Field of Classification Search ............... 710/313, 710/105
See application file for complete search history.

(56) References Cited

U.S. PATENT DOCUMENTS 6,601,124 B1 *   7/2003  Blair ......................... 710/305
2002/0169915 A1 * 11/2002  Wu .......................... 710/305

FOREIGN PATENT DOCUMENTS

| JP | A 11-194993   | 7/1999  |
| JP | A 11-245487   | 9/1999  |
| JP | A 2000-293479 | 10/2000 |

OTHER PUBLICATIONS

Universal Serial Bus Specification—Revision 1.1—Sep. 23, 1998—Section 7.1.7.1: Connect and Disconnect Signaling.*

* cited by examiner

*Primary Examiner*—Rehana Perveen
*Assistant Examiner*—Jeremy S. Cerullo
(74) *Attorney, Agent, or Firm*—Oliff & Berridge, PLC

(57) ABSTRACT

In a CPU, a FET is turned off and power is not supplied to a power supply element of a transceiver for a period of time until predetermined initialization processing, which is implemented in a peripheral device when power is supplied via a cable from a host PC, has been concluded (i.e., a period of time until it becomes possible for the peripheral device to initiate data communication with the host PC). Thus, even if the peripheral device and the host PC are physically connected by a cable, data signals transmitted along signal lines are not relayed by the transceiver to a logic controller, whereby it in effect becomes possible to set the peripheral device in a pseudo-non-connected state with respect to the host PC.

18 Claims, 6 Drawing Sheets

INTERFACE APPARATUS FOR MEDIATING SENDING AND RECEIVING SIGNALS BETWEEN DEVICES CONNECTED BY A SIGNAL LINE

BACKGROUND OF THE INVENTION

1. Field of the Invention

The present invention relates to an interface apparatus for mediating the sending and receiving of signals between devices mutually connected by a signal line having at least one pair of signal transmission lines.

2. Description of the Related Art

In personal computers (PC) of recent years, the Universal Serial Bus (USB) has gained attention as a common interface standard for connecting peripheral devices, such as keyboards, mice, speakers, modems, printers, and scanners, to a PC that acts as a host (host PC).

With the USB, it is possible to connect individual peripheral devices in a treelike manner from the host PC. By disposing, for example, a hub for the peripheral devices, it is possible to connect many peripheral devices downstream from the peripheral devices. The operation of all of the connected peripheral devices is managed by the host PC, and various kinds of data are transferred between the individual peripheral devices and the host PC. In this data transfer, it is not possible for the individual peripheral devices to request data transfer from the host PC. Data exchange is always conducted in accordance with a call from the host PC. It is possible for data to be transferred at a rate of 12 Mbps in the full-speed mode (FS mode) and 1.5 Mbps in the low-speed mode (LS mode). Transfer rates are set in individual peripheral devices in accordance with the purposes of the peripheral devices.

USB cables, which connect the upstream host PC and hub for the peripheral devices (collectively referred to below as "upstream devices") and individual downstream peripheral devices (collectively referred to below as "downstream devices"), comprise four lines: one pair of signal lines (D+ line and D− line) and one pair of power lines ($V_{cc}$ line and GND line). At the point in time at which the upstream devices are connected to the downstream devices with a USB cable, it becomes possible for power to be supplied from the upstream devices to the downstream devices via the power lines.

A ground pull-down resistor of predetermined resistance (e.g., 15 kΩ) is connected to each of the D+ line and the D− line at a USB cable connection interface (USB I/F) disposed at the upstream devices. At the USB I/F disposed at the downstream devices, a pull-up resistor of predetermined resistance (e.g., 1.5 kΩ) to the power voltage $V_{DD}$ (3.0 V to 3.6 V) is connected to the D+ line in the case of FS-mode peripheral devices and connected to the D− line in the case of LS-mode peripheral devices. Thus, when the USB cable is not connected at the USB I/F of the upstream devices, the D+ line element and the D− line element are held at a low potential (L level). At the point in time at which the upstream devices and the downstream devices are connected by the USB cable, the signal line (e.g., the D+ line in the case of FS-mode peripheral devices) pulled up at the power voltage $V_{DD}$ at the USB I/F of the downstream devices is held at a high potential (H level) by the power voltage $V_{DD}$ and the other signal line (e.g., the D− line in the case of FS-mode peripheral devices) is held at the L level.

According to the above structure, by detecting the voltage levels of the D+ line element and the D− line element of the USB I/F, it is possible to for the upstream devices including the host PC to identify whether there is a connection with the downstream devices and to identify the transfer rates which the downstream devices support. It should be noted that, when a connection with the downstream devices is identified, the host PC carries out a call for initiating data transfer with respect to the downstream devices.

However, when the downstream devices are devices for which it is necessary to conduct predetermined initialization processing immediately after power has been supplied thereto (e.g., in the case of a printer, when it is necessary to conduct a memory check and warm up printer engine parts immediately after power has been supplied to the printer), there are cases in which, even if a connection with the downstream devices is identified at the host PC and a call for initiating data transfer is made, the downstream devices cannot respond to the call from the host PC until the initialization processing is concluded. When there is no response from the downstream devices, sometimes the host PC determines that there is no connection even if there is a connection with the downstream devices, and the host PC cuts the downstream devices away from the system.

In order to eliminate this problem, technology has been conventionally proposed in which the connected downstream devices are set in a pseudo-non-connected state during the period of time until the downstream devices are able to respond to the call from the host PC (e.g., the period of time until the initialization processing is concluded).

For example, technology (referred to below as Prior Art 1) has been proposed (e.g., see Japanese Patent Application Laid-open Publication No. 11-245487) as shown in FIG. 6A wherein, in a FS-mode downstream device disposed with a USB I/F 40, a pull-down resistor $R_A$ and a switching element 42, which is grounded, are serially connected to the D+ line that is pulled up (not illustrated), and the D+ line is held at the L level by turning on the switching element 42 during the period of time until the downstream device is able to respond to the call from the host PC.

Other technology (referred to below as Prior Art 2) has been proposed (e.g., see Japanese Patent Application Laid-open Publication No. 2000-293479) as shown in FIG. 6B wherein, in a FS-mode downstream device disposed with a USB I/F 40, a switching element 44 is serially connected to a D+ line that is pulled up by a pull-up resistor $R_B$ at a power voltage $V_{DD}$, and the D+ line element is held at the L level by turning the switching element 44 off during the idling period.

Further still, technology (referred to below as Prior Art 3) has been proposed (e.g., see Japanese Patent Application Laid-open Publication No. 11-194993) as shown in FIG. 6C wherein switching elements 46 and 48 are respectively disposed on the D+ and D− lines connecting upstream devices and downstream devices, and individual devices connected to both lines are appropriately identified by turning on/off the switching elements 46 and 48 and connecting/disconnecting the D+ and D− lines themselves.

By applying the aforementioned prior arts, it is possible to appropriately detect a connection in the USB connection between the host PC and peripheral devices and to normally conduct data transmission.

Recently, in response to a demand to accelerate data communication speed accompanying an increase in the mass of data handled by PCs, such as image data, the USB 2.0 specification, which allows for a high-speed mode (HS mode) at 48 Mbps in addition to the LS and FS modes, has been devised and officially released as a higher standard of the USB (USB 1.1, etc.). The USB 2.0 specification basically follows in the footsteps of conventional USB specifications (USB 1.1, etc.).

With the USB 2.0, a pull-up resistor (1.5 kΩ) to the power voltage $V_{DD}$ is connected to the D+ line as in the case of the FS mode, and in the HS mode output impedance in each of the D+ and D– lines is set to a predetermined value (e.g., 45 Ω). When the upstream devices and the downstream devices are connected, the differential voltage of the D+ line and the D– line is approximately 400 mV. When the upstream devices and the downstream devices are not connected, the differential voltage of the D+ line and the D– line is approximately 800 mV.

In the HS mode, the USB I/F is driven in a J mode (in which the D+ line element is at the H level and the D– line element is at the L level) or in a K mode (in which the D+ line element is at the L level and the D– line element is at the H level) at the upstream devices in order to detect connection with the downstream devices. When the differential voltage of the D+ line element and the D– line element is 625 mV or greater in this case, it is identified that the downstream devices are not connected to the upstream devices.

However, it is difficult to apply the above Prior Arts 1 and 2 and set the downstream devices in a pseudo-non-connected state during the period of time until the downstream devices are able to respond to the call from the host PC, in order to conduct data communication between the host PC and the peripheral devices normally with respect to devices conforming to the USB 2.0 standard, in which connection between the devices is detected as described above.

Moreover, with devices conforming to the USB 2.0 standard corresponding to the rapid data transfer rate HS mode, there is the potential for trouble to occur in data communication when the above Prior Art 2 is applied and a switching element is disposed directly on the signal lines.

SUMMARY OF THE INVENTION

The present invention has been devised in order to eliminate the above-described drawbacks. It is an object of the invention to provide an interface apparatus that can appropriately identify whether or not there is a connection between individual devices and carry out highly reliable data transfer.

In a first aspect of the invention, there is provided an interface apparatus for mediating the sending/receiving of signals between a plurality of devices that are mutually connected by a signal line having at least one pair of signal transmission lines, the interface apparatus comprising: signal relay section for relaying electric signals that are transferred via the signal line between the devices; connection determination section for determining, on the basis of signal voltage in each signal transmission line of the signal line, whether or not the devices are connected; and connection control section for incapacitating, when it has been determined by the connection determination section that the devices are connected, the signal relay section until the devices move to a state in which it is possible to mutually send/receive the signals.

In a second aspect of the invention, there is provided an interface apparatus for mediating the sending/receiving of signals between a plurality of devices that are mutually connected by a signal line having at least one pair of signal transmission lines, the interface apparatus comprising: signal relay section for relaying electric signals that are transferred via the signal line between the devices; connection determination section for determining, on the basis of signal voltage in each signal transmission line of the signal line, whether or not the devices are connected; and connection control section for stopping, when it has been determined by the connection determination section that the devices are connected, power supply to the signal relay section until the devices move to a state in which it is possible to mutually send/receive the signals.

In a third aspect of the invention, there is provided an interface apparatus for mediating the sending/receiving of signals between a plurality of devices that are mutually connected by a signal line having at least one pair of signal transmission lines, the interface apparatus comprising: signal relay section for relaying, when a differential voltage is within a predetermined value range, electric signals that are transferred via the signal line between the devices, the differential voltage being a difference in respective signal voltage values in the pair of signal transmission lines; connection determination section for determining, on the basis of the signal voltage in each signal transmission line of the signal line, whether or not the devices are connected; and connection control section for setting, when it has been determined by the connection determination section that the devices are connected, the differential voltage in each signal transmission line of the signal line to be outside the predetermined value range until the devices move to a state in which it is possible to mutually send/receive the signals.

According to the first through third aspects of the invention, it is possible to incapacitate the signal relay section during initialization processing of the devices and for the devices to be set in a pseudo-non-connected state even when the devices are mutually connected by the signal lines. Thus, it is possible to avoid transmission errors, such as transmission response error in signal transmission, and to carry out highly reliable signal transmission.

According to another aspect of the invention, each of the sections in any of the first through third aspects of the invention includes a specification that conforms to the Universal Serial Bus (USB) standard.

Because the respective section includes a specification that conforms to the USB standard, it is possible to easily achieve a commonly applicable interface apparatus in common information processing devices such as a personal computer.

DESCRIPTION OF THE PREFERRED EMBODIMENT

Figure 1:
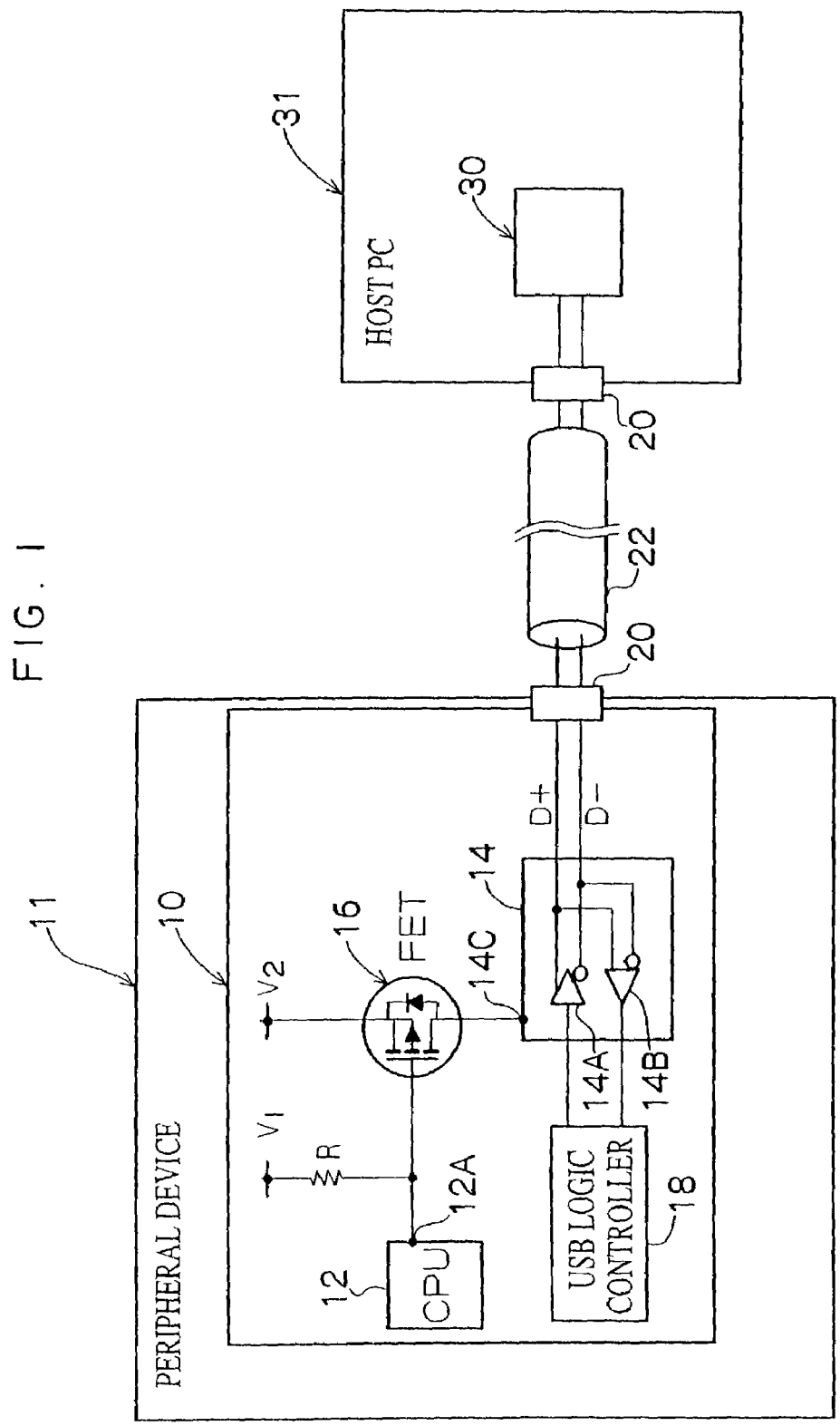
FIG. 1 is a view for explaining the schematic structure of an interface apparatus pertaining to an embodiment of the present invention.

Referring to the drawings, description will be given below of an embodiment of the present invention.

FIG. 1 shows the schematic structure of a peripheral device 11 disposed with an interface apparatus 10 (hereinafter, "the I/F 10") pertaining to the embodiment of the invention. The peripheral device 11 is a device that conforms to the aforementioned USB 2.0 standard and is set such that predetermined initialization processing is implemented, immediately after power has been supplied to the device, by a main CPU (not illustrated) that controls the main operations of the peripheral device 11. As the peripheral device 11, it is possible to employ, for example, a common printer that conducts a warm-up and the like of printer engine parts and the like corresponding to the initialization processing immediately after power has been supplied.

A host PC 31, which comprises a common personal computer (PC), is connected to the peripheral device 11 so that it is possible for various kinds of data to be transferred between the host PC 31 and the peripheral device 11. Connectors 20, which are respectively disposed at the peripheral device 11 and the host PC 31, are connected by a cable 22.

The host PC 31 is disposed with a host interface section 30 (hereinafter, "the host I/F section 30") that has a data transfer specification that conforms to the USB 2.0 standard. Through the host I/F section 30, it is possible for various kinds of data to be sent and received between the host PC 31 and the peripheral device 11 via the cable 22.

The cable 22 comprises a USB cable that includes a total of four lines: one pair of signal lines (D+ line and D− line) and one pair of power lines (not illustrated). When the respective connectors 20 of the host PC 31 and the peripheral device 11 are connected by the cable 22, power is supplied from the host PC 31 to the peripheral device 11 via the power lines of the cable 22.

The I/F 10 disposed in the peripheral device 11 comprises: a CPU 12, which acts as the main control section of the I/F 10; a transceiver 14, to which the signal lines (D+ line and D− line) of the cable 22 are connected; a field-effect transistor (FET) 16, which functions as a switching element for supplying power voltage to the transceiver 14; and a logic controller 18, which handles various kinds of data sent and received between the peripheral device 11 and the host PC 31.

The CPU 12 is connected to a main CPU (not illustrated). Under the control of the main CPU, the CPU 12 functions as the main control section of the I/F 10.

The CPU 12 is disposed with an output port 12A. The output port 12A is pulled up at a power voltage $V_1$ by a resistor R and connected to a gate of the FET 16. A drain of the FET 16 is connected to a power voltage $V_2$. In an operation initialization state in which power is supplied from the host PC 31 via the aforementioned power lines, the output port 12A of the CPU 12 is held at a high potential (H level) and set so that power is not supplied to a power supply element 14C of the transceiver 14.

By controlling the output potential of the output port 12A of the CPU 12 in this manner, it is possible to control the power supply to the transceiver 14 by effecting on/off control of the FET 16.

The logic controller 18 is connected to the main CPU (not illustrated), so that it is possible for various kinds of data to be delivered between the main CPU and the logic controller 18. The logic controller 18 is also connected to the transceiver 14. Via the transceiver 14, the logic controller 18 relays data signals sent and received between the main CPU and the host PC 31.

The transceiver 14 includes an output driver 14A and an input differential receiver 14B for input.

The output driver 14A uses as input a data signal transferred from the peripheral device 11 to the host PC 31. The output driver 14A includes a non-inverting output, which is connected to the D+ line of the signal lines of the cable 22, and an inverting output, which is connected to the D− line of the signal lines of the cable 22. It should be noted that output impedance of the output driver 14A is set in accordance with the specification of the USB 2.0 standard to 45 $\Omega \pm 10\%$.

The input differential receiver 14B includes a non-inverting input, which is connected to the D+ line of the signal lines of the cable 22, and an inverting input, which is connected to the D− line of the signal lines of the cable 22. The input differential receiver 14B uses as output to the logic controller 18 a differential signal between the non-inverting input and the inverting input.

Figure 2:
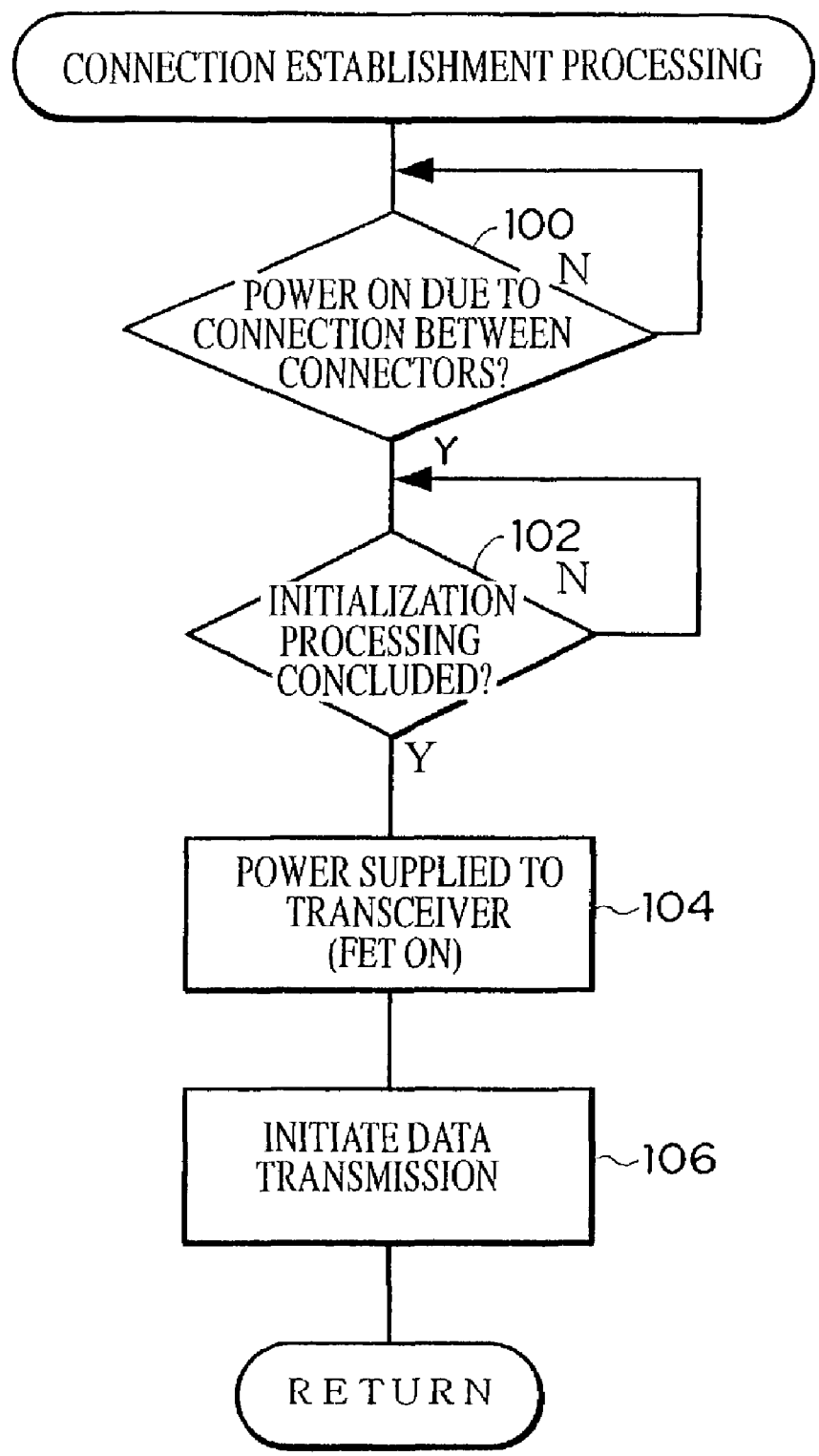
FIG. 2 is a flow chart illustrating the flow of connection establishment processing pertaining to the embodiment of the invention.

Operation of the present embodiment will now be described with reference to the processing routine illustrated in FIG. 2.

When the cable 22 is connected to the respective connectors 20 of the peripheral device 11 and the host PC 31, it is determined in step 100 whether or not power is being supplied from the host PC 31 to the peripheral device 11 via the power lines of the cable 22 (i.e., whether or not power is on). When the determination is negative, step 100 is repeated. When the determination is affirmative, the processing routine proceeds to step 102.

Figure 3:
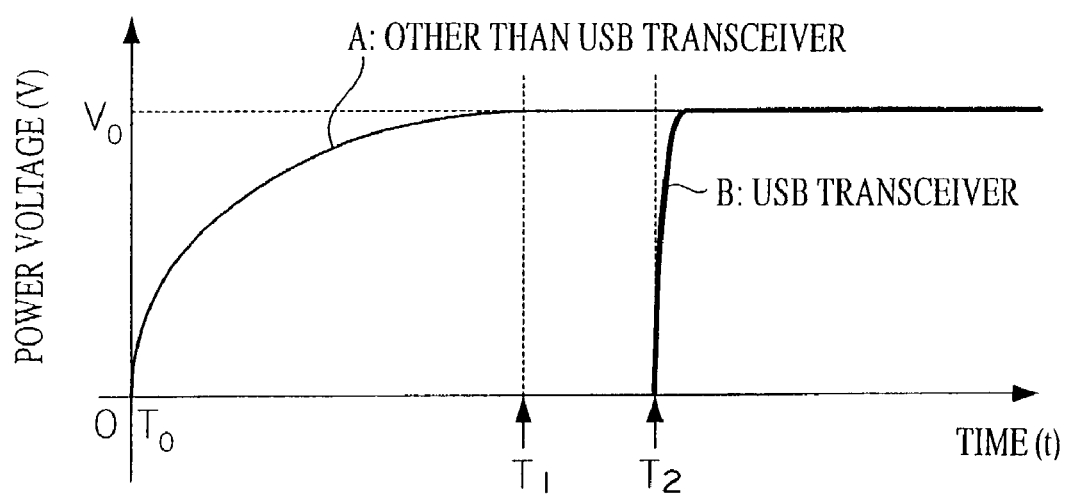
FIG. 3 is a view for explaining temporal changes in power voltage values in a transceiver and devices other than the transceiver, pertaining to the embodiment of the invention.

As illustrated in FIG. 3, in the I/F 10 of the peripheral device 11 that has been turned on, power supply is initiated with respect to sections other than the transceiver 14 from the point in time ($T_0$) at which power is turned on (refer to characteristic curve A). The aforementioned predetermined initialization processing is initiated at the point in time ($T_1$) when the supplied voltage reaches a predetermined value $V_0$. It should be noted that, during implementation of the initialization processing, the FET 16 is off and power is not supplied to the transceiver 14 (refer to characteristic curve B). Thus, although the peripheral device 11 and the host PC 31 are physically connected by the cable 22, the transceiver 14, which relays data signals transmitted along the power lines (D+ line and D− line), is off. Therefore, data signals are not relayed to the logic controller 18. As a result, the peripheral device 11 and the host PC 31 are in a pseudo-non-connected state.

In step 102, it is determined whether or not the implemented initialization processing has been concluded. When the determination is negative, step 102 is repeated.

When it is affirmatively determined in step 102 that the initialization processing has been concluded ($T_2$ in FIG. 3), the processing routine proceeds to step 104, the FET 16 is turned on, and power is supplied to the transceiver 14 (refer to characteristic curve B in FIG. 3). Thus, it becomes possible for the transceiver 14 to relay data signals to the logic controller 14.

In step 106, data transfer is initiated between the peripheral device 11 and the host PC 31.

According to the I/F pertaining to the present embodiment as described above, by setting the peripheral device so that it is in a pseudo-non-connected state for a period of time until predetermined initialization processing implemented in the turned-on peripheral device has been concluded (i.e., a period of time until it becomes possible for the peripheral device to respond to the host PC), it is possible to avoid response error at the time data transfer is initiated and to carry out highly reliable data transfer.

Description will now be given of a modified example of the present embodiment.

Figure 4:
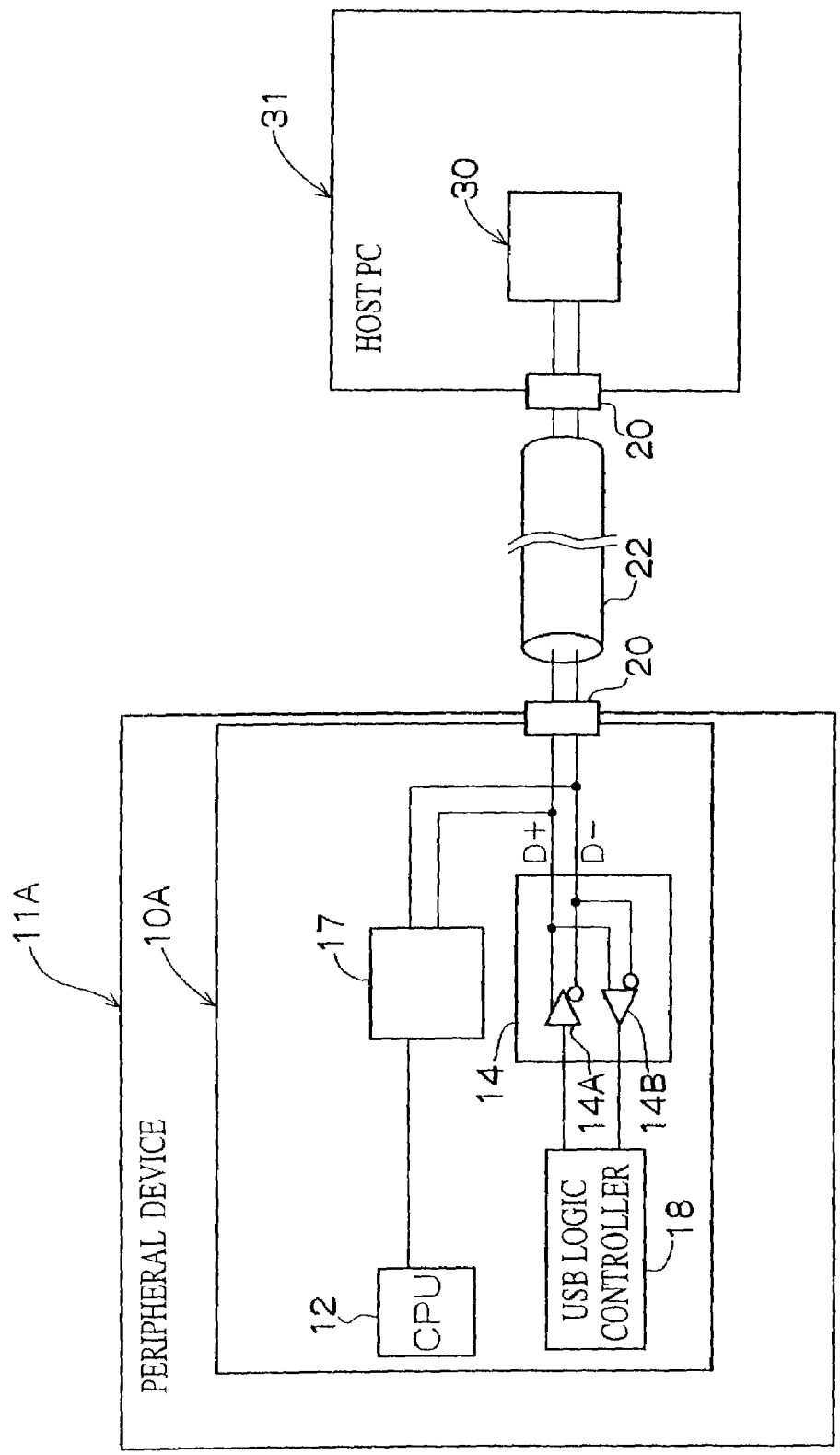
FIG. 4 is a view for explaining the schematic structure of an interface apparatus pertaining to a modified example of the embodiment of the invention.

FIG. 4 illustrates the schematic structure of a peripheral device 11A disposed with an I/F 10A pertaining to the modified example of the embodiment. It should be noted that structural parts in the peripheral device 11A that are the same as those in the peripheral device 11 disposed with the I/F 10 pertaining to the embodiment described above are given the same reference numerals, and description thereof is omitted. Also, similar to the I/F 10, the peripheral device 11A is a device that conforms to the USB 2.0 standard.

The I/F 10A is disposed with a differential voltage control section 17 in place of the FET 16.

The differential voltage control section 17 is for setting differential voltage, which is a difference in respective signal voltages in the signal lines (D+ line and D− line) of the cable 22, to a predetermined value in accordance with a control signal from the CPU 12. The differential voltage control section 17 is connected to each of the D+ line and the D− line and detects the signal voltage in each of the D+ line and the D− line. By variably setting the signal voltage in at least one of the D+ line and the D− line (e.g., by setting impedance values of the D+ line and the D− line), it is possible for the differential voltage control section 17 to set the signal voltage to a predetermined value.

It should be noted that, in the transceiver 14 that includes the specification conforming to the USB 2.0 standard, when the differential voltage, which is the difference between respective signal voltages in the connected D+ line and D− line, is equal to or exceeds a predetermined value (625 mV), it is determined that the cable 22 is not connected and data transfer is stopped.

Because the differential voltage control section 17 controls the differential voltage in the D+ line and the D− line, it is possible to control the signal relay function of the transceiver 14 in response to the determination with respect to the cable 22 connection.

Figure 5:
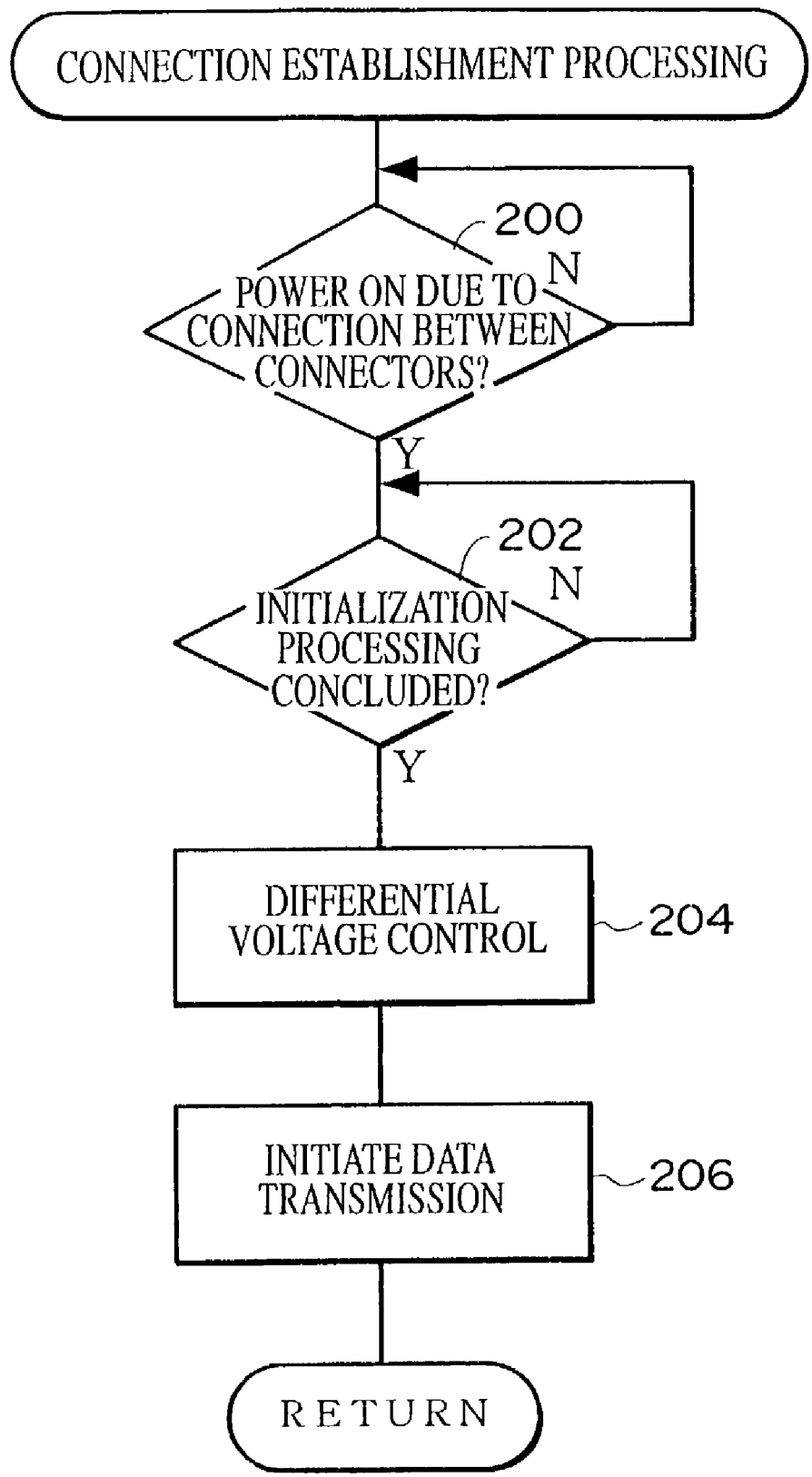
FIG. 5 is a flow chart illustrating the flow of connection establishment processing pertaining to the modified example of the embodiment of the invention.
Figure 6A:
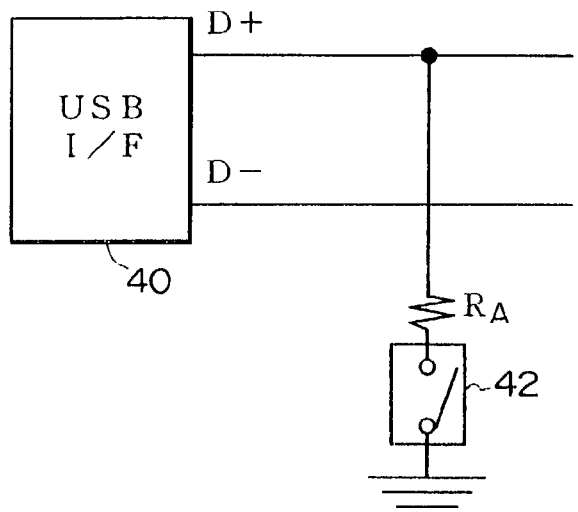
FIGS. 6A, 6B, and 6C are views for explaining the schematic structures of conventional peripheral devices.
Figure 6B:
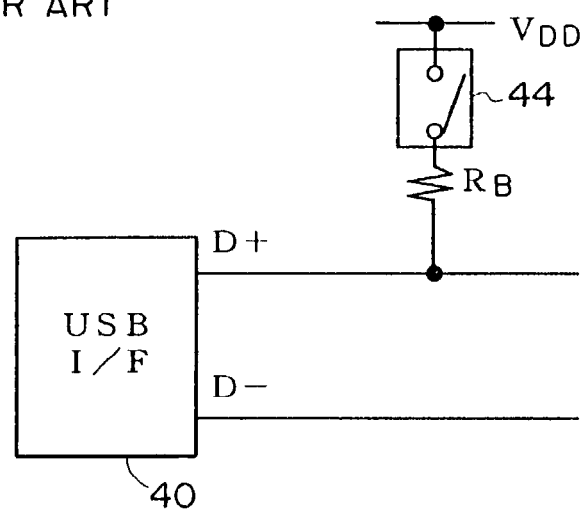
Figure 6C:
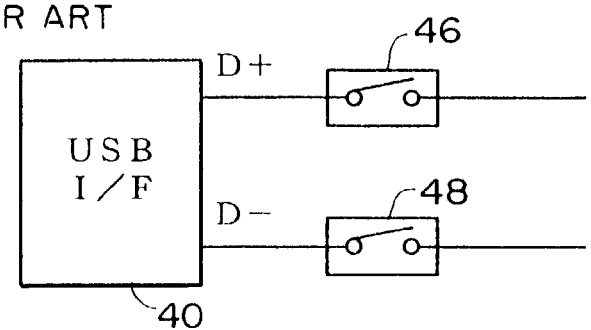

Operation of the present modified example will now be described with reference to the processing routine illustrated in FIG. 5.

When the respective connectors 20 of the peripheral device 11A and the host PC 31 are connected by the cable 22, it is determined in step 200 whether or not power is being supplied from the host PC 31 to the peripheral device 11A via the power lines of the cable 22 (i.e., whether or not power is on). When the determination is negative, step 200 is repeated. When the determination is affirmative, the processing routine proceeds to step 202.

In the I/F 10A of the peripheral device 11A that has been turned on, power supply to various sections is initiated, and the aforementioned predetermined initialization processing is initiated at the point in time when the supplied voltage reaches the predetermined value $V_0$. It should be noted that, during implementation of the initialization processing, the differential signal voltage in the D+ line and D− line is set by the differential voltage control section 17 to become equal to or exceed a predetermined value (625 mV). Thus, although the peripheral device 11A and the host PC 31 are physically connected by the cable 22, the peripheral device 11A and the host PC 31 are set in a pseudo-non-connected state, and data signals transmitted along the signal lines (D+ line and D− line) are not relayed to the logic controller 18.

In step 202, it is determined whether or not the implemented initialization processing has been concluded. When the determination is negative, step 202 is repeated.

When it is affirmatively determined in step 202 that the initialization processing has been concluded, the processing routine proceeds to step 204, the differential signal voltage in the D+ line and the D− line is set by the differential voltage control section 17 to a voltage (e.g., about 400 mV) less than the predetermined value (625 mV), and the pseudo-non-connected state setting between the peripheral device 11A and the host PC 31 is cancelled. Thus, it becomes possible for the transceiver 14 to relay data signals to the logic controller 18.

In step 206, data transfer between the peripheral device 11A and the host PC 31 is initiated.

According to the I/F pertaining to the present modified example as described above, similar to the aforementioned embodiment, by setting the peripheral device so that it is in a pseudo-non-connected state for a period of time until predetermined initialization processing implemented in the turned-on peripheral device has been concluded (i.e., a period of time until it becomes possible for the peripheral device to respond to the host PC), it is possible to avoid response error at the time data transfer is initiated and to carry out highly reliable data transfer.

It should be noted that, in the aforementioned embodiment and in the modified example thereof, switching control of the FET 16 and control of the differential voltage control section 17 are carried out by the CPU 12 disposed in the I/F 10 (10A) as shown in FIGS. 1 and 4. However, the invention is not limited to the same. The invention may be configured so that switching control of the FET 16 and control of the differential voltage control section 17 are controlled directly from the main CPU (not illustrated) of the peripheral device 11 (11A) without disposing the CPU 12 in the I/F 10 (10A). Moreover, the invention may also be configured so that the main CPU of the peripheral device 11 (11A) or the output port device connected to the CPU 12 of the I/F 10 (10A) is separately disposed in the I/F 10 (10A), the port of the output port device is connected to the gate of the FET 16 or the differential voltage control section 17, and switching control of the FET 16 and control of the differential voltage control section 17 are carried out from the main CPU or the CPU 12 via the output port device.

What is claimed is:

1. An interface apparatus for mediating the sending/receiving of signals between a plurality of devices that are mutually connected by a signal line having at least one pair of signal transmission lines D+ and D−, the interface apparatus comprising:

a signal relay section for relaying electric signals that are transferred via the signal line between the devices;

a connection determination section for determining, on the basis of signal voltage in each signal transmission line of the signal line, whether or not the devices are connected; and a connection control section for incapacitating, when it has been determined by the connection determination section, based on a differential voltage of the D+ line and the D− line, that the devices are connected, the signal relay section until the devices move to a state in which it is possible to mutually send/receive the signals.

2. The interface apparatus of claim 1, wherein the connection control section stops, when it has been determined by the connection determination section that the devices are connected, power supply to the signal relay section until the devices move to a state in which it is possible to mutually send/receive the signals.

3. The interface apparatus of claim 1, wherein each of the signal relay section, the connection determination section and the connection control section has a specification that conforms to the USB standard.

4. The interface apparatus of claim 1, wherein the signal line comprises a USB cable.

5. The interface apparatus of claim 1, wherein the devices include a host PC and at least one peripheral device, the at least one peripheral device conducting initialization processing immediately after power has been supplied thereto, with the peripheral device being unable to send signals to or receive signals from the host PC for a predetermined period of time until the initialization processing has been concluded.

6. The interface apparatus of claim 1, wherein the interface apparatus is disposed in one of the devices.

7. The interface apparatus of claim 1, wherein the devices include a host PC and a peripheral device for sending signals to and receiving signals from the host PC, with the interface apparatus being disposed in the peripheral device.

8. The interface apparatus of claim 1, wherein said connection control section capacitates the signal relay section after the plurality of devices move to the state in which it is possible to mutually send/receive the signals.

9. The interface apparatus of claim 8, wherein the signal relay section includes a signal input differential circuit and a signal output circuit, wherein said connection control section incapacitates the signal relay section by turning off the power supply for driving the signal input differential circuit and the signal output circuit, and capacitates the signal relay section by turning on the power supply for driving the signal input differential circuit and the signal output circuit.

10. An interface apparatus for mediating the sending/receiving of signals between a plurality of devices that are mutually connected by a signal line having at least one pair of signal transmission lines D+ and D−, the interface apparatus comprising:
    a signal relay section for relaying, when a differential voltage is within a predetermined value range, electric signals that are transferred via the signal line between the devices, the differential voltage value being a difference in respective signal voltages in the pair of signal transmission lines;
    a connection determination section for determining, on the basis of the signal voltage in each signal transmission line of the signal line, whether or not the devices are connected; and
    a connection control section for setting, when it has been determined by the connection determination section, based on a differential voltage of the D+ line and the D− line, that the devices are connected, the differential voltage in each signal transmission line of the signal line to be outside the predetermined value range until the devices move to a state in which it is possible to mutually send/receive the signals.

11. The interface apparatus of claim 10, wherein each of the signal relay section, the connection determination section and the connection control section has a specification that conforms to the USB standard.

12. The interface apparatus of claim 10, wherein the signal line comprises a USB cable.

13. The interface apparatus of claim 10, wherein the devices include a host PC and at least one peripheral device, the at least one peripheral device conducting initialization processing immediately after power has been supplied thereto, with the peripheral device being unable to send signals to or receive signals from the host PC for a predetermined period of time until the initialization processing has been concluded.

14. The interface apparatus of claim 10, wherein the interface apparatus is disposed in one of the devices.

15. The interface apparatus of claim 10, wherein the devices include a host PC and a peripheral device for sending signals to and receiving signals from the host PC, with the interface apparatus being disposed in the peripheral device.

16. An interface apparatus for mediating the sending/receiving of signals between a plurality of devices that are mutually connected by a signal line having at least one pair of signal transmission lines D+ and D−, the interface apparatus comprising:
    a signal input differential circuit and a signal output circuit for relaying electric signals that are transferred via the signal line between the devices; and
    a connection control section for controlling turning on/off of a power supply for driving the signal input differential circuit and the signal output circuit based on a differential voltage of the D+ line and the D− line.

17. The interface apparatus of claim 16, wherein said connection control section turns off a power supply for driving the signal input differential circuit and the signal output circuit until the devices move to a state in which it is possible to mutually send/receive the signal, and turns on the power supply for driving the signal input differential circuit and the signal output circuit after the devices move to a state in which it is possible to mutually send/receive the signal.

18. The interface apparatus of claim 16, wherein each of the signal input differential circuit, the signal output circuit, and the connection control section includes a specification conforming to the USB 2.0 standard.

* * * * *